Sept. 9, 1947.　　　　F. M. DARNER　　　　2,427,322
COLLET CONSTRUCTION FOR BAR TURNING MACHINES
Filed Nov. 30, 1942
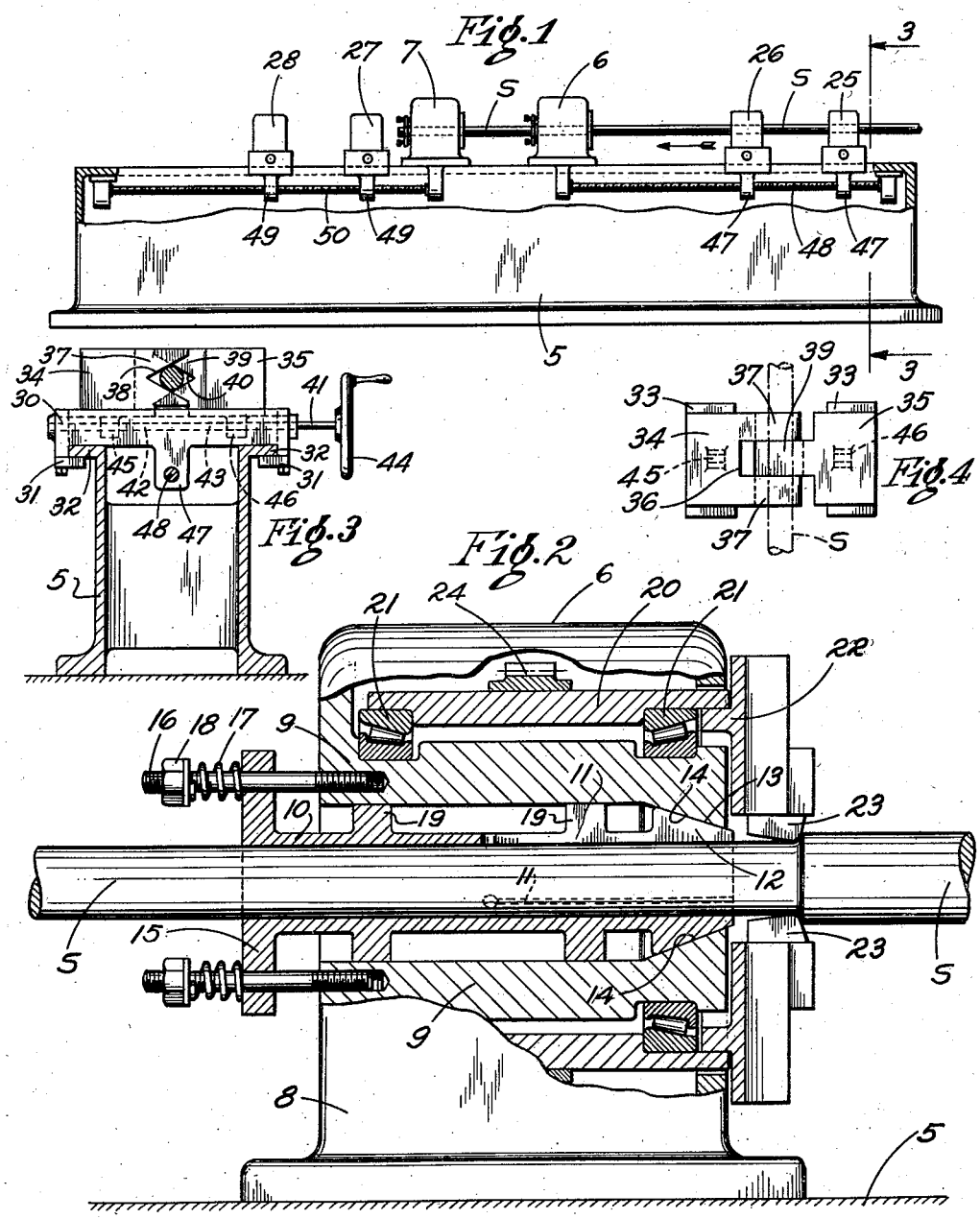
INVENTOR.
FREDERIC M. DARNER
BY Richey & Watts
ATTORNEYS Patented Sept. 9, 1947

2,427,322

UNITED STATES PATENT OFFICE 2,427,322

COLLET CONSTRUCTION FOR BAR TURNING MACHINES

Frederic M. Darner, Shaker Heights, Ohio, assignor to Republic Steel Corporation, Cleveland, Ohio, a corporation of New Jersey Application November 30, 1942, Serial No. 467,307

5 Claims. (Cl. 82—20)

1

This invention relates to machines for turning or otherwise working upon the exterior surface of bar stock, tubes and the like, and more particularly to supporting and feeding mechanism for such machines.

Heretofore it has been customary to finish the exterior surfaces of bars, tubes and the like by cold drawing through dies, or by turning the stock in a lathe or screw machine. Each of these methods has certain disadvantages and limitations. The present invention has for its principal object the feeding of bars and the like axially in continuous succession through cooperating relatively rotatable members, one of which firmly supports the stock and the other of which carries the tools.

Other objects of this invention are to grip and feed the stock through a work station, such as a head having rotating cutting tools, in such a manner as to hold the stock rigidly against radial movement without preventing axial sliding, and without scoring or marring the exterior surface; to facilitate the feeding and handling of bars and the like through a machine in which the bar is subjected to forces tending to deflect the same; and to improve and simplify the construction of machines for turning the outer surfaces of bars, tubes and the like. Other objects and advantages will appear from the following description of a preferred embodiment of the invention.

In the accompanying drawing,

Fig. 1 is a side elevation of a machine for turning bars, tubes and the like constructed in accordance with this invention;

Fig. 2 is a vertical section on an enlarged scale through one of the turning heads illustrating the arrangement for centering and supporting the stock;

Fig. 3 is a section taken substantially on the line 3—3 of Fig. 1; and

Fig. 4 is a detail plan view of a pair of clamping blocks removed from their slide.

Referring to the drawings, the turning machine illustrated is mounted upon an elongated bed frame 5, resembling in some ways an ordinary lathe bed. Spaced stationary heads 6 and 7, carrying rotatable tools for taking a rough cut and a finish cut, respectively, from the exterior surface of the stock, are mounted upon the frame 5 in axial alignment. Essentially each head, of which any desired number may be provided, consists of two relatively rotatable parts, one carrying cutting tools and the other means for gripping the stock and holding it centered

2 with respect to the tools while permitting axial feeding of the stock through the members. In the illustrated embodiment the gripping member is stationary and the tool carrying member rotatable about the stock. This arrangement has the important advantage of simplifying the feed, since the stock does not turn.

The head 6 is illustrated in section in Fig. 2. The head consists of a stationary frame member 8 secured to the bed 5 and having an integral sleeve 9. A tube 10 is slidably disposed within the sleeve 9 and surrounds the stock S. The forward end of the tube 10 is provided with a collapsible collet or bushing of any suitable type arranged to be compressed to grip the stock. In the illustrated embodiment the end of the tube 10 is rendered resilient by a plurality of slots 11 extending inwardly from the forward end thereof. To effect the compression of the slotted portion of the tube upon the stock, the forward end is formed with an enlargement 12 having a conical exterior surface 13 arranged to engage a complemental surface 14 formed in the stationary sleeve 9. It will be understood, of course, that the main body of the tube and the collapsible portion may be separate members fastened together if desired.

At its rearward end the tube 10 is arranged to be pressed forwardly in any suitable manner, as by pneumatic, hydraulic or spring means. As illustrated, the tube terminates in a flange 15 disposed outside the frame member 8. A plurality of studs 16 project rearwardly from the frame member 8 through apertures in the flange 15 and carry springs 17 and nuts 18. The springs 17 are compression springs arranged to exert a force against the flange 15 tending to urge the tube 10 forwardly in the sleeve 9 so as to effect wedging engagement of the conical surfaces 13 and 14 and collapse the slotted forward end of the tube inwardly upon the stock S.

To facilitate the assembly of the tube 10 in the sleeve 9, and to simplify the construction, the bore of the sleeve 9 is made uniform in diameter rearwardly from the maximum diameter of the conical wedging surface 14. The tube 10 is formed with spaced flanges 19 which slidably fit in the bore of the sleeve 9, thereby permitting assembly of the tube in the sleeve from the rearward end of the latter.

A driving ring 20 is disposed in the frame member 8 and surrounds the sleeve 9. Suitable antifriction bearings 21 are arranged to support the opposite ends of the driving ring 20 from the sleeve 9. The forward end of the driving ring projects out of the frame member 8 and has secured to it a tool carrying ring 22. Suitable cutting tools 23 are carried upon the ring 22. The driving ring 20 is arranged to be rotated by any suitable mechanism so as to carry the tools 23 around the stock S and turn the exterior surface of the same in the desired manner as the stock is fed through the machine. As illustrated, the driving ring 20 is provided on its outer surface with a gear 24 arranged to be engaged by another gear driven by a motor (not shown) which may be carried in any suitable arrangement by the bed frame 5.

The head 7 is identical with the head 6 except that preferably the tools 23 carried in the head 6 are arranged to perform a rough cut upon the stock, and the tools mounted in the head 7 are arranged to give a finish cut.

Suitable feeding means are provided to feed the stock through the heads 6 and 7. Simple forms of feeding devices may be employed for this purpose with the illustrated embodiment, since the stock is held against rotation with respect to the bed frame, and it is only necessary to force the successive pieces axially through the heads. As shown, a pair of clamps 25 and 26 are slidably mounted at the entrance side of the machine, and duplicate clamps 27 and 28 are similarly mounted for sliding movement upon the exit side of the machine.

The construction of a suitable form of clamp is illustrated in Figs. 3 and 4. A carriage 30, forming the face of the clamp, rests upon the upper surface of the bed frame 5, and has downwardly and inwardly extending guides 31 embracing outwardly extending flanges 32 formed on the frame. The upper surface of the carriage 30 is provided with suitable transverse guideways slidably receiving flanges 33 formed upon opposed clamp sections 34 and 35.

The clamp section 34 has a vertical slot 36 forming spaced side members 37, each of which is provided with a V-groove 38. The clamp section 35 has a central tongue 39 fitting within the slot 36 and formed with a V-groove 40 facing the grooves 38. A shaft 41 journalled in the carriage 30 has right and left hand threads 42 and 43 and is arranged to be rotated in any suitable way, as by a handwheel 44. Lugs 45 and 46 depending from the clamp sections 34 and 35 are threadedly engaged with the threads 42 and 43, respectively, so that rotation of the shaft 41 in one direction slides the clamp sections together and rotation in the opposite direction separates them. Thus by turning the handwheel 44 in the proper direction the clamp sections are drawn together and the opposed grooves 38 and 40 rigidly clamp the stock S.

The base of each of the clamps 25 and 26 carries a nut 47 projecting into the bed of the machine and surrounding and threadedly engaged with a feed screw 48 arranged to be rotated by a suitable mechanism. Similarly, each of the clamps 27 and 28 carries a nut 49 projecting into the bed of the machine and threadedly engaged with the feed screw 50.

In operation, a rough bar or tube S is gripped in the clamps 25 and 26 at the entrance end of the machine and the feed screw 48 is rotated to advance the stock into the head 6. Preferably the leading end of the stock is pointed so that it enters the forward end of the tube 10 before being engaged by the cutting tools 23. Thus when the tools 23 begin to work upon the stock it is supported and centered in the tube. In idle position the tube 10 is pushed forwardly by the springs 17 so that its split forward end is collapsed by the action of the wedging surfaces 13 and 14. As soon as the stock is gripped within the split end of the tube 10, the latter is pushed rearwardly against the force of the springs 17 to permit the split end to spring open sufficiently to receive the stock. At the same time the springs 17 press the tube 10 forwardly with sufficient force to maintain the enlarged head 12 firmly seated against the conical surface 14 in the stationary sleeve 9, and against the surface of the stock. The pressure of the springs 17 can be controlled by adjustment of the nuts 18. A pressure is selected such that the stock is accurately centered and is solidly supported in a radial direction, so that it cannot chatter or weave from the action of the tools. The stock may be forced axially through the tube 10 by the clamps 25 and 26 because its motion is in a direction to relieve the wedging force, while at the same time the force of the springs 17 and the angle of the wedging surfaces 13 and 14 are such as to prevent the tube 10 from being wedged back by the radial forces so that the stock is maintained rigidly and accurately centered with respect to the rotating tools 23.

The yieldability of the tube 10 in the direction of feed of the stock also prevents binding or marring of the stock from any slight variation in diameter or surface contour or from chips, dirt or the like which might get between the stock and the tube 10.

When the stock has been fed through the two heads 6 and 7 and projects a sufficient distance beyond the head 7 the feed screw 50 may be rotated in the same direction and at the same speed as the screw 48, and the stock may be gripped by the clamps 27 and 28 at the exit end of the machine. The clamps 25 and 26 may then be opened and the screw 48 reversed to return them to their starting position at the entrance end of the machine, while the remainder of the length of the stock is pulled through the heads 6 and 7 by the clamps 27 and 28. Thus while one piece of stock is being completed a new piece may be placed in the clamps 25 and 26 so that its leading end may follow closely the trailing end of the preceding piece. It will be understood that one or any other number of heads may be employed, depending upon the operations it is desired to perform upon the stock.

Although a preferred embodiment of the invention has been described in considerable detail, it will be understood that many variations and modifications may be made therein without departing from the scope of the invention as defined in the following claims.

I claim:

1. Means for working upon bars and similar stock comprising a head, an annular member surrounding said stock and rotatably mounted in said head and carrying tools to engage the stock, a fixed support surrounding the stock, wedge means disposed between and engaging said fixed support and the stock, and directly transmitting radial forces from the stock to said fixed support, said wedge means being disposed adjacent to said tools and acting as the sole centering means for the stock, and a spring urging said wedge means in a direction to tighten the same between the stock and said fixed support and clamp means for preventing rotation of and feeding the stock in a direction to loosen said wedge means.

2. Means for working upon bars and similar stock comprising a head, an annular member surrounding said stock and rotatably mounted in said head and carrying tools to engage the stock, a fixed support surrounding the stock upon one side of and adjacent said tools, wedge means disposed between and engaging the stock and said fixed support, said wedge means being arranged to tighten when moved in a direction toward said tools, said wedge means being disposed adjacent to said tools and acting as the sole centering means for the stock, and spring means urging said wedge means towards said tools and clamp means for preventing rotation of and for feeding the stock in the opposite direction through said tools and said fixed support.

3. A machine for turning bars and similar stock comprising a stationary frame member having an aperture therethrough and an internal wedging surface surrounding said aperture, a collet member having integral compressible jaw members adapted to surround the stock each of said jaw members having an external wedging surface in engagement with said internal wedging surface, means for yieldably pressing said member in one direction to effect engagement between said wedging surfaces, an annular tool carrying member surrounding said stock and rotatably mounted with respect to said frame member and carrying tools adapted to engage the stock, and means for feeding stock through said member in the opposite direction.

4. A machine for turning bars and similar stock comprising a frame, a head mounted on said frame and including a member having an opening therethrough to receive the stock, a tube disposed in said opening and surrounding the stock, said tube having a radially compressible element, an annular tool carrying member surrounding said stock and rotatably mounted with respect to said member, said member having a tool arranged to engage the stock, cooperating wedging surfaces on said tube element and said member, said support and tube having slidingly engaged cylindrical surfaces, means urging said tube in one direction to effect engagement of said wedging surfaces and compress said tube, and means for feeding stock through said tube in the opposite direction.

5. Means for working on bar stock comprising a fixed head having a first annular portion and a second annular portion surrounding said first annular portion, a sleeve rotatable between said annular portions, cutting tools carried by one end of said sleeve adjacent one end of said first annular portion, the inner surface of said first annular portion being cylindrical for part of its length and converging therefrom to the end adjacent to said tools, stock centering means disposed within said first annular portion and formed with an external wedge surface engaging the said converging surface, said centering means having an axial opening defined by a surface complemental to the outer surface of the bar stock and through which opening bar stock may be passed endwise, and having an outer surface engageable with the cylindrical surface of said first annular portion, said centering means directly transmitting radial forces from the stock to said fixed head, said portions, sleeve and centering means being coaxially mounted in telescopic relation, elastic means urging said stock centering means in a direction opposite to that of the travel of the bar to cause the said centering means to center the stock as the stock moves endwise, bar feeding means engageable with said stock and operable to feed the stock axially thru said centering means, and means for causing relative rotation of the stock and tools.

FREDERIC M. DARNER.

REFERENCES CITED

The following references are of record in the file of this patent:

UNITED STATES PATENTS

| Number | Name | Date |
| --- | --- | --- |
| 2,201,173 | Hanitz | May 21, 1940 |
| 2,311,998 | Pope | Feb. 23, 1943 |
| 1,676,738 | Lotterman | July 10, 1928 |
| 1,782,692 | Lawson | Nov. 25, 1930 |
| 1,744,697 | Granger | Jan. 21, 1930 |

FOREIGN PATENTS

| Number | Country | Date |
| --- | --- | --- |
| 27,815 | France (1st addition to 565,199) | Aug. 19, 1924 |